United States Patent [19]

Karcher et al.

[11] Patent Number: 4,918,181

[45] Date of Patent: Apr. 17, 1990

[54] TERTIARYAMINOALKYL-HYDROXYALKYL ETHERS OF POLYGALACTOMANNANS

[76] Inventors: Dennis J. Karcher, 8907 Raintree Dr.; Michael E. Morgan, 7316 Six Mile La., Apt. #42, both of Louisville, Ky. 40220; Martha A. Phelps, 302 Eline Ave., Louisville, Ky. 40207

[21] Appl. No.: 162,910

[22] Filed: Mar. 2, 1988

[51] Int. Cl.$^4$ .................... C07G 17/001; C07H 15/04
[52] U.S. Cl. .................... 536/114; 536/120
[58] Field of Search ................... 536/114, 120

[56] References Cited

U.S. PATENT DOCUMENTS

| | | | |
|---|---|---|---|
| 4,144,179 | 3/1979 | Chatterji | 536/88 |
| 4,464,268 | 8/1984 | Schievelbein | 166/307 |
| 4,552,668 | 11/1985 | Brown et al. | 210/759 |
| 4,647,385 | 3/1987 | Williams et al. | 166/308 |

Primary Examiner—Ronald W. Griffin
Assistant Examiner—Pamela S. Webber

[57] ABSTRACT

Dialkylaminoalkyl-hydroxyalkyl ethers of polygalactomannan are useful as thickening agents for aqueous fluids.

9 Claims, No Drawings

TERTIARYAMINOALKYL-HYDROXYALKYL ETHERS OF POLYGALACTOMANNANS

BACKGROUND OF THE INVENTION

The field of art to which this invention pertains is water-soluble polymers.

Polygalactomannans, particularly the naturally occurring guar gum and locust bean gum, have been known for some time and have found many industrial uses. To improve the performance of these gums and to widen their fields of use, polygalactomannans have been modified by reaction with various reagents to form derivatives of the gums. Examples of such derivatives are hydroxyalkyl ethers of polygalactomannans, aminoalkyl ethers of polygalactomannans, mixed derivatives which are carboxyalkyl-hydroxyalkyl ethers and carboxyalkyl-aminoalkyl ethers of polygalactomannans.

Hydroxyalkyl ethers of polygalactomannans are described in U.S. Pat. No. 3,326,890. Aminoalkyl ethers of the gums are disclosed in U.S. Pat. No. 3,498,912. Carboxyalkyl-hydroxyalkyl mixed derivatives are described in U.S. Pat. No. 3,723,409. Mixed derivatives containing both anionic groups, e.g., carboxyalkyl, and cationic groups, e.g., aminoalkyl, are disclosed in U.S. Pat. No. 3,467,647.

An important use for polygalactomannans and their derivatives is as thickeners for industrial applications. However, after the purpose for using the thickened aqueous fluid has been served, it is often desirable to lower the viscosity of the fluid. This lowering of viscosity is accomplished by using a "breaker" which acts on the water-soluble polymer to reduce its molecular weight and to thin the fluid in which it is dissolved.

The breaking of aqueous gels or thickened aqueous fluids has been accomplished by various techniques. One such method is to use the degradative action of acids, enzymes, or mild oxidizing agents as disclosed in U.S. Pat. No. 4,169,791. In U.S. Pat. No. 4,464,268, sodium hypochlorite is described as being a drastic treating agent for degrading water-soluble polymers. The use of ammonium and alkali metal persulfates in combination with tertiary amines is disclosed in U.S. Pat. No. 4,250,044 as being a suitable beaker system for high viscosity fluids. Lithium hypochlorite is described as a breaker material in Oil and Gas Journal, Dec. 12, 1983, pp. 96–101. The thickening of aqueous fluids and various techniques for reducing the viscosity of the fluids is described in such patents as U.S. Nos. 3,002,960; 3,779,914; 4,144,179; and 4,552,668. As described in U.S. Pat. No. 4,654,043, starch sizing agents are degraded by treatment with hypochlorites and amino compounds.

In commonly assigned U.S. Pat. No. 4,647,385, the viscosity of thickened aqueous solutions is reduced by the addition of alkali metal and alkaline earth metal salts of hypochlorous acid plus tertiary amines. The combination of the salt and the tertiary amine is much more efficient in speed of reduction in viscosity and in the completeness of the degradation of the polymer than the use of the metal salt alone.

Thickened aqueous fluids are useful in oil recovery processes, particularly in the practice of fracturing subterranean formations. In the fracturing operations, a thickened fluid having granular insoluble particulate material suspended therein, is injected down a well penetrating the formation under hydraulic pressure. The pressurized fluid causes the formation to crack or fracture. The suspended insoluble granular particles are forced into the fractures and prop open the fractures when the fracturing pressures are released. Before the well is put back into operation, the thickened fluid must be removed from the well. Such removal is facilitated if the viscosity can be quickly reduced.

Industry is constantly searching for improved and efficient thickeners for aqueous fluids and for more efficient breaker systems.

SUMMARY OF THE INVENTION

This invention is directed to derivatives of polygalactomannans. In one aspect, this invention pertains to a double derivative of a polygalactomannan. In another aspect, this invention relates to thickened aqueous fluids made from the double derivative. In still another aspect, this invention pertains to a process for reducing the viscosity of thickened aqueous fluids.

The composition of this invention is a tertiaryaminoalkyl ether-hydroxyalkyl ether of a polygalactomannan. The degree of substitution (DS) of the product, i.e., the amount of tertiaryaminoalkyl ether substitution, ranges from about 0.001 to about 0.2. The molecular substitution (MS) of the product, i.e., the amount of hydroxyalkyl ether substitution, ranges from about 0.05 to about 1.6.

The composition of this invention is used to thicken and to gel aqueous fluids for various applications. Such applications include the fracturing of subterranean formations penetrated by a borehole, for use in oil and gas well drilling, completion and workover fluids and in industrial, personal care, carpet dyeing, and waste treatment processes. When desired, the viscosity of the thickened or gelled fluids is reduced by the addition of alkali metal or alkaline earth metal salts of hypochlorous acid or a chlorinated isocyanurate.

DESCRIPTION OF THE INVENTION

The water soluble polymers of this invention are tertiaryaminoalkyl-hydroxyalkyl ethers of polygalactomannans. These polymers are made by reacting a polygalactomannan with a dialkylaminoalkyl halide or epoxide, and an alkylene oxide.

The polygalactomannans from which the tertiary amino polygalactomannans are derived are hydrocolloid polysaccharides composed principally of galactose and mannose units and are usually found in the endosperm of leguminous seeds, such as guar, locust bean, honey locust, flame tree, and the like. Guar, for example, is composed mostly of a galactomannan which is essentially a straight chain mannan with single-membered galactose branches. The mannose units are linked in a 1,4-B-glycosidic linkage and the galactose branching takes place by means of a 1–6 linkage on alternate mannose units. The ratio of galactose to mannose units in the guar polymer is one to two.

Locust bean gum is also a polygalactomannan of similar molecular structure in which the ratio of galactose to mannose is one to four. Guar and locust bean gum are the preferred sources of the polygalactomannans, principally because of their commercial availability.

The tertiary amino derivatizing agents useful in this invention are dialkylaminoalkyl halides or epoxides wherein the alkyl group contains from 1 to 6 carbon atoms and wherein the total number of carbon atoms does not exceed 12. The halides are chloride, bromide, and iodide with the chloride being preferred.

Examples of useful tertiaryamino alkyl derivatizing agents are dimethylaminomethyl chloride, dimethylaminoethyl chloride, dimethylaminopropyl chloride, methylethylaminopropyl bromide, dimethylaminoisopropyl chloride, methylethylaminoisopropyl chloride, diethylaminobutyl iodide, 3-dimethylamino -1,2-epoxypropane, 3-diethylamino -1,2-epoxypropane, and other isomers.

The hydroxyalkyl derivatizing agents useful in this invention are alkylene oxides, wherein the alkylene group contains from two to four carbon atoms and the epoxide group is on adjacent carbon atoms. Examples of alkylene oxides are ethylene oxide, propylene oxide-1,2, butylene oxide-1,2, and butylene oxide-2,3. The preferred alkylene oxide is propylene oxide-1,2.

The compositions of this invention are prepared by first forming the hydroxyalkyl ether derivative followed by the reaction with the tertiaryaminoalkyl derivatizing agent. The polygalactomannan can be reacted with the derivatizing agents in powder or granular form, or in the form of splits. The reactions can be conducted in aqueous, non-aqueous, or mixed systems using alkali as the condensing or catalytic agent. When using powder or granular polygalactomannans, preferred reaction media are lower alcohol-water mixture, e.g., methanol or isopropanol, and water. The preferred medium for reacting splits is water.

The amount of alkali catalyst used in this reaction will vary from about 0.1 to about 5 weight percent based on the weight of the polygalactomannan. When the tertiaryaminoalkyl derivatizing agent is a halide or halide salt, then the amount of alkali used is at least equivalent to the halide in the derivatizing agent, and, preferably, is in excess of the halide.

The reaction of alkylene oxides with polygalactomannans is described in detail in U.S. Pat. Nos. 3,326,890 and 3,723,409, which are hereby incorporated by reference. The reaction of polygalactomannans with dialkylaminoalkyl halides or epoxides is described in U.S. Pat. No. 3,498,912, which is hereby incorporated by reference.

The compositions of this invention have a hydroxyalkyl ether substitution of about 0.05 to about 1.6 moles per galactomannan unit (MS) and, preferably, about 0.3 to about 1.0. The tertiaryaminoalkyl ether substitution will vary from about 0.001 to about 0.2 mole per galactomannan unit (DS) and, preferably, about 0.004 to about 0.1.

The reduction in viscosity of aqueous solutions of the compositions of this invention is conducted by adding to the solutions alkali metal and alkaline earth metal salts of hypochlorous acid, or chlorinated isocyanurates. The hypochlorite salts include magnesium hypochlorite, calcium hypochlorite, lithium hypochlorite, sodium hypochlorite, and potassium hypochlorite. The preferred salts are sodium and calcium hypochlorite.

The chlorinated isocyanurates useful in this invention include trichloro-s-triazine trione, sodium dichloro-s-triazine trione, potassium dichloro-s-triazine trione, sodium dichloro-s-triazine trione dihydrate, and mixtures thereof.

The reduction in viscosity of aqueous fluids made according to this invention, is conducted on aqueous fluids which ae thickened with about 10 to about 80 pounds of tertiaryamino hydroxyalkyl polygalactomannan per 1000 gallons of aqueous fluid. Preferably the amount of tertiaryamino hydroxyalkyl polygalactomannan will be about 20 to about 60 pounds per 1000 gallons.

The amount of metal hypochlorite or chlorinated isocyanurate used to reduce the viscosity of the thickened aqueous fluid will vary from about 0.1 to about 5 pounds per 1000 gallons of aqueous fluid and preferably about 0.5 to about 2 pounds per 1000 gallons.

The thickened aqueous fluid prior to the addition of the hypochlorite salt has a pH of about 6 to about 11 and, preferably, about 7 to about 10. The temperature of the system will vary from about 50° F. to about 300° F. The breaker systems of this invention are particularly useful at temperatures of about 70° to about 250° F.

The following examples describe the invention in more detail. Parts and percentages are by weight unless otherwise designated.

EXAMPLE 1

To a suitable reactor were added 69.3 parts of powdered hydroxypropyl guar having an MS of 0.4 and 125 parts of isopropyl alcohol. Agitation was begun and a nitrogen sparge was applied. With the temperature at 18° C., a solution of 11.9 parts of dimethylaminopropyl chloride hydrochloride in 35 parts of deionized water was added over a period of 20 minutes. After 10 minutes, the addition of a solution of 8 parts of sodium hydroxide in 35 parts of water was begun and completed in 20 minutes with the temperature rising to 23° C. Heat was applied raising the temperature to 70° C. in 35 minutes. The temperature was held at 70° C. for 1 hour and was then lowered to 21° C. The reactor contents were mixed with 500 parts by volume of a 60/40 methanol/water solution. After soaking for 30 minutes, the liquid phase was removed and discarded. Another 500 parts of methanol and water (60/40) were added and after soaking for 30 minutes, the liquid phase was removed and discarded. The swollen gum product was mixed with 1000 parts of acetone and was allowed to soak for 30 minutes. The mixture was vacuum filtered on a Buckner funnel and was washed with 300 parts of acetone. The gum product was spread on a tray and dried overnight. Seventy one parts of air dried product were recovered.

A solution of the guar product in deionized water was prepared in the proportions of 40 pounds of the guar derivative to 1000 gallons of solution (40 lbs/1000 gal). After hydrating for 2 hours at pH 6.0, the pH was adjusted to 8.0 with dilute aqueous sodium hydroxide. The viscosity of the solution was 127 Fann Units. A 3% aqueous calcium hypochlorite solution, 0.9 ml, was added. The viscosity dropped to 22 Fann units in one minute.

EXAMPLE 2

To a suitable reactor were added 90 parts of powdered hydroxypropyl guar, (M.S 0.4), and 175 parts of isopropyl alcohol. Nitrogen sparging and agitation were begun. After 15 minutes with the temperature at 21° C., a solution of 0.1 part of the methyl ether of hydroqunone, 0.1 part of citric acid and 25 parts of deionized water was added over a five minute period. After 10 minutes, a solution of 7.9 parts of dimethylaminopropyl chloride hydrochloride in 25 parts of water was added over 15 minutes. After 10 minutes, a solution of 6 parts of sodium hydroxide in 40 parts of water was added over 12 minutes. The temperature was then raised to 75° C. over 33 minutes and was held at 75°

C. for 2 hours and 30 minutes. The temperature was then lowered to 22° C. The reactor contents were washed three times with 1000 parts by volume of a 60/40 mixture of methanol and water. After each washing, the liquid phase was removed by decantation. The gum product was then mixed with 500 parts by volume of methanol. The liquid phase was separated from the gum product by vacuum filtration on a Buckner funnel. The funnel contents were then washed with 500 parts of acetone again using vacuum. The product was spread on a tray and was dried over the weekend at room temperature. 82.2 parts of guar product were recovered.

EXAMPLE 3

To a suitable reactor were added 90 parts of powdered guar and 200 parts of isopropyl alcohol. Agitation and nitrogen sparge were begun. After 1 hour and 5 minutes, a solution of 6 parts of sodium hydroxide in 50 parts of water was added over 20 minutes. After holding for 10 minutes and with the temperature at 24° C., the addition of 29 parts of propylene oxide was begun and completed in 5 minutes. The temperature was raised to 60° C. in 20 minutes and was held at 60° C. for 2 hours and 5 minutes.

A solution of 7.9 parts of dimethylaminopropyl chloride hydrochloride was then added over 30 minutes. The temperature was raised to 70° C. in 15 minutes and was held at 70° C. for two hours. The temperature was then lowered to room temperature. After washing, dehydrating, and drying using the procedure of Example 2, 91.4 parts of product were recovered.

EXAMPLE 4

To a suitable reactor were added 1760 parts of deionized water, 170 parts of 50% sodium hydroxide in water, and 4 parts of borax. The temperature was raised to 170° F. and 2000 parts of double purified guar splits were added. The reactor was sealed and was purged three times with nitrogen. Vacuum to -10 inches of mercury was applied and 450 parts of propylene oxide were added with the temperature at 144° F. The temperature was raised 162° F. and the pressure was held at 10 psig by controlling the propylene oxide addition. The addition of propylene oxide was completed in 56 minutes. The temperature was held at 159°-162° F. until the pressure dropped to −5 inches of mercury. The reactor was then purged twice with nitrogen and was pressured with nitrogen to 5 psig. After holding for 15 minutes at 159° F., purging with nitrogen and pressurizing were repeated. The pressure was lowered to −10 inches of mercury and a solution of 176 parts of dimethylaminopropyl chloride hydrochloride in 740 parts of water was added. The temperature was held at 160° C. for 10 minutes. A 50% solution of sodium hydroxide (350 parts) and 100 parts of water were added. Heating at 160° F. was continued for 2 hours. The reactor contents were cooled to room temperature and were washed 3 times with water. The derivatized guar splits were then milled and dried under heated air (550° F.).

EXAMPLE 5

Thickened solutions were prepared from the derivatized guar products of Examples 1, 2, 3, and 4 by adding the guar to water containing 2 percent potassium chloride in the proportions of 40 pounds of derivatized guar to 1000 gallons of solution. After hydrating for two hours, the pH was adjusted to 8.0 with dilute sodium hydroxide. The viscosity was determined with a Fann Model 35 Viscometer. A 3% aqueous solution of calcium hypochloride was added in the proportion of 2.25 gallons per 1000 gallons. The viscosity was then determined at intervals over 10 minutes.

The viscosity determinations are listed in the table.

What is claimed:

1. As a composition to matter, the dialkylaminoalkyl ether-hydroxyalkyl ether of a polygalactomannan.

2. The composition of claim 1 wherein the degree of substitution (DS) of the tertiaryaminoalkyl ether group is from about 0.001 to about 0.2, and wherein the molecular substitution (MS) of the hydroxyalkyl group is from about 0.05 to about 1.6.

3. The composition of claim 2 wherein the DS is about 0.004 to about 0.1 and the MS is about 0.3 to about 1.0.

4. The composition of claim 1 wherein the polygalactomannan is guar gum.

5. The composition of claim 1 wherein the polygalactomannan is locust bean gum.

6. The composition of claim 1 wherein the alkyl groups in the dialkylaminoalkyl ether contain from 1 to 6 carbon atoms and wherein the total number of carbon atoms in the alkyl groups does not exceed 12.

7. The composition of claim 6 wherein the dialkylaminoalkyl ether group is dimethylaminoisopropyl ether.

8. The composition of claim 1 wherein the alkyl group of the hydroxyalkyl ether contains 2 to 4 carbon atoms.

9. The composition of claim 8 wherein the hydroxyalkyl group is hydroxypropyl.

* * * * *

UNITED STATES PATENT AND TRADEMARK OFFICE
CERTIFICATE OF CORRECTION

PATENT NO.   : 4,918,181

DATED        : April 17, 1990

INVENTOR(S)  : Karcher, Morgan and Phelps

It is certified that error appears in the above—identified patent and that said Letters Patent is hereby corrected as shown below:

Cover page under "Inventors", insert --Assignee: Hi-Tek Polymers, Inc. Louisville, KY --

Column 4, line 61 delete "hydroqunone" and insert --hydroquinone--

Column 6, after line 23 insert

| --Example | | | | | Viscosity (cps) | |
|---|---|---|---|---|---|---|
| | Init. | 30 sec. | 1 min. | 2 min. | 5 min. | 10 min. |
| 1 | 25 | 6 | 4 | 4 | 4 | 4 |
| 2 | 36 | 10 | 9 | 8 | 8 | 8 |
| 3 | 33 | 9 | 7 | 5 | 4 | 4 |
| 4 | 38 | 11 | 10 | 10 | 10 | 10 |

The principles, preferred embodiment and modes of operation of the present invention have been described in the foregoing specification.

UNITED STATES PATENT AND TRADEMARK OFFICE
CERTIFICATE OF CORRECTION

PATENT NO. : 4,918,181

DATED : April 17, 1990

INVENTOR(S) : Karcher, Morgan and Phelps

It is certified that error appears in the above-identified patent and that said Letters Patent is hereby corrected as shown below:

The invention which is intended to be protected herein, however, is not to be construed as limited to the particular forms disclosed, since these are to be regarded as illustrative rather than restrictive. Variations and changes may be made by those skilled in the art without departing from the spirit of the invention.--

Column 6, line 25 (Claim 1), delete "to" and insert --of--.

Signed and Sealed this

Twenty-seventh Day of August, 1991

Attest:

HARRY F. MANBECK, JR.

Attesting Officer

Commissioner of Patents and Trademarks